(12) United States Patent
Bossmanns et al.

(10) Patent No.: US 7,467,827 B2
(45) Date of Patent: Dec. 23, 2008

(54) GEAR STAGE FOR A VEHICLE SEAT

(75) Inventors: Bernd Bossmanns, Erkrath (DE); Michael Berres, Leverkusen (DE); Karsten Kalmus, Bochum (DE); Rolf Schüler, Heiligenhaus (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/786,975

(22) Filed: Apr. 13, 2007

(65) Prior Publication Data

US 2007/0205647 A1 Sep. 6, 2007

Related U.S. Application Data

(63) Continuation of application No. PCT/EP2005/010352, filed on Sep. 24, 2005.

(30) Foreign Application Priority Data

Oct. 14, 2004 (DE) .................. 10 2004 049 994

(51) Int. Cl.
*B60N 2/24* (2006.01)

(52) U.S. Cl. .................. 297/354.1; 297/362.12; 475/189; 74/144

(58) Field of Classification Search .............. 297/354.1, 297/362.12, 362; 475/189, 247; 74/144, 74/421 A, 424.9

See application file for complete search history.

(56) References Cited

U.S. PATENT DOCUMENTS

| 1,686,446 | A | * | 10/1928 | Gilman | 475/189 |
| 3,229,538 | A | * | 1/1966 | Schottler | 476/8 |
| 3,237,468 | A | * | 3/1966 | Schottler | 476/9 |
| 3,248,960 | A | * | 5/1966 | Schotler | 475/115 |
| 3,504,574 | A | * | 4/1970 | Kenzo | 475/189 |
| 4,592,247 | A | * | 6/1986 | Mutschler | 475/189 |
| 4,593,574 | A | * | 6/1986 | Sinn et al. | 475/189 |
| 4,634,181 | A | * | 1/1987 | Pipon | 297/362 |

(Continued)

FOREIGN PATENT DOCUMENTS

CH 356972 9/1961

(Continued)

OTHER PUBLICATIONS

Hrsg. Von W. Beitz und K.-H. Grote, "Dubbel, Taschenbuch für den Maschinenbau", pp. G116-G119, 2001 Edition, 20. Aufl, Springer-Verlag Berlin Heidelberg New York.

(Continued)

*Primary Examiner*—Laurie K Cranmer
(74) *Attorney, Agent, or Firm*—Womble Carlyle Sandridge & Rice, PLLC

(57) ABSTRACT

A gear stage (14) for a vehicle seat, in particular for a motor vehicle seat, has a driving shaft (16) and a driven shaft (18). The gear stage (14) reduces the rotational speed of the driving shaft (16) to a lower rotational speed of the driven shaft (18). The gear stage (14) comprises at least one row (24) of transmission balls upon which tangentially lie at least one, and in particular two driving surfaces (22) of the driving shaft (16), at least one driven surface (26) of the driven shaft (18) and at least one housing surface (28) of a housing (32).

17 Claims, 2 Drawing Sheets

U.S. PATENT DOCUMENTS

| | | | |
|---|---|---|---|
| 4,667,525 A * | 5/1987 | Schottler | 475/115 |
| 5,016,487 A | 5/1991 | Bollmann | |
| 5,209,637 A * | 5/1993 | Reubeuze | 475/176 |
| 6,212,965 B1 | 4/2001 | Hochmuth | |
| 6,592,186 B1 | 7/2003 | Mühlberger et al. | |
| 6,601,467 B1 | 8/2003 | Fütterer | |

FOREIGN PATENT DOCUMENTS

| | | |
|---|---|---|
| DE | 894 184 | 10/1953 |
| DE | 29 28 127 A1 | 2/1981 |
| DE | 33 21 883 A1 | 12/1984 |
| DE | 33 35 445 A1 | 4/1985 |
| DE | 283 669 A5 | 10/1990 |
| DE | 196 55 146 A1 | 4/2000 |
| EP | 1 128 979 B1 | 9/2001 |
| GB | 2 178 507 A | 2/1987 |
| WO | WO 01/04512 A1 | 1/2001 |

OTHER PUBLICATIONS

W. Beitz and K.-H Küttner, "Dubbel, Handbook of Mechanical Engineering", pp. F110-F116, 1994 Edition, Springer-Verlag London Limited.

* cited by examiner

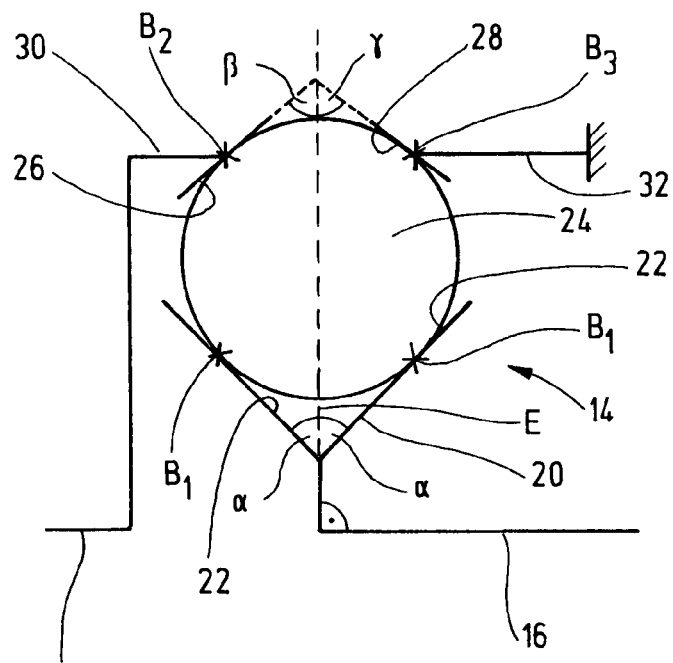
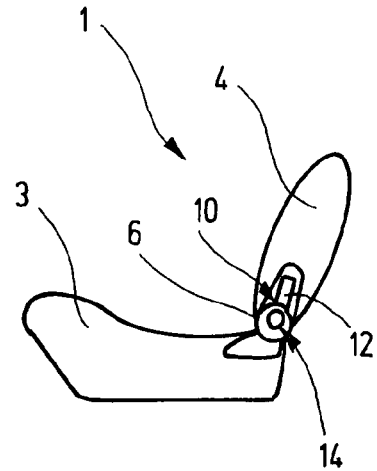
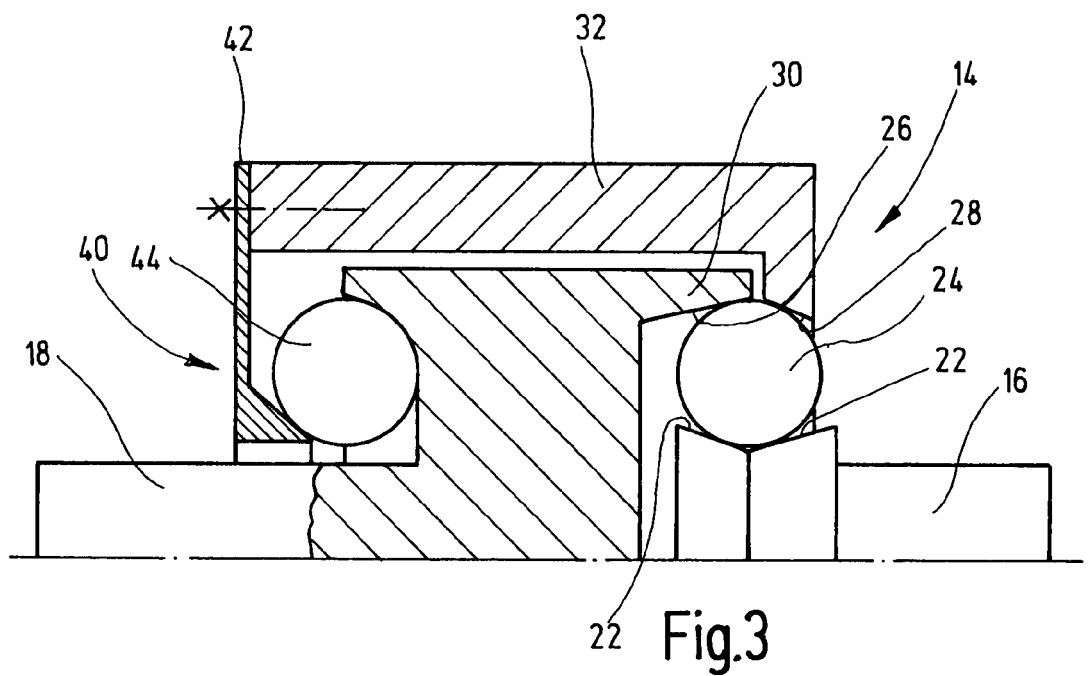

GEAR STAGE FOR A VEHICLE SEAT

CROSS-REFERENCE TO RELATED APPLICATION

The present application is a continuation of International Application PCT/EP2005/010352, which was filed Sep. 24, 2005. The entire disclosure of International Application PCT/EP2005/010352, which was filed Sep. 24, 2005, is incorporated herein by reference.

BACKGROUND OF THE INVENTION

The present invention relates to a gear stage for a vehicle seat, in particular for a motor vehicle seat, wherein the gear stage is for causing a driven shaft to rotate in response to a drive shaft being rotated, so that the driven shaft rotates slower than the drive shaft.

Gear stages of the type described immediately above are used for motor-adjustable vehicle seats so that an occupant may achieve an optimum seat position by adjusting individual components relative to one another. The gear stage is driven by a motor and includes gearwheels of different diameters so that, comparing the output to the input, the rotational speed is reduced and the torque is increased.

BRIEF SUMMARY OF SOME ASPECTS OF THE INVENTION

An aspect of the present invention is the provision of improvements to a gear stage of the type mentioned above.

In accordance with one aspect of the present invention, a gear stage for a vehicle seat, in particular for a motor vehicle seat, is operatively associated with a drive shaft and a driven shaft for causing the driven shaft to rotate in response to rotation of the drive shaft. The driven shaft rotates slower than the drive shaft. The gear stage includes at least one gear ball row. At least one drive surface of the drive shaft bears tangentially against the gear ball row. At least one driven surface of the driven shaft bears tangentially against the gear ball row. A housing having at least one housing surface bears tangentially against the gear ball row.

Because at least one drive surface of the drive shaft, in particular two drive surfaces of the drive shaft, at least one driven surface of the driven shaft and at least one housing surface of the housing bear tangentially against the at least one gear ball row, a low-noise, single-stage gear arrangement with a high transmission ratio and requiring little construction space is provided. The gear stage is preferably constructed as a concentrically radially symmetrical hollow shaft gear, with the absence of unbalanced masses and the absence of eccentric movements being of benefit for the lack of noise. The balls of the gear ball row (e.g., the row of balls), which may also be replaced by rolling bodies acting in an identical manner, ensure low-noise operation. The use of identical balls renders the outlay on sorting and storage superfluous for the installation. The arrangement of the balls makes it possible for all of the balls to be supported with a slanting position and for increased friction to be avoided. A very small boring friction, which is significantly smaller than the sliding friction of cylindrical rollers having micro-slip, arises at the contact points of the balls. For this reason, shallow inclinations of the contact surfaces are preferred, with a reduced boring movement of the balls and therefore a very high degree of efficiency resulting therefrom. The osculating and surface pressure conditions are similar to the conditions found in angular ball bearings or four-point bearings.

The gear ball row has pressure applied to it by three components which rotate differently from one another and preferably have four pressure application surfaces, with one component having two pressure application surfaces, i.e. a groove. The component with the two pressure application surfaces determines, in each case via the two contact points, the speed profile of the rolling ball. The drive surfaces, the driven surface and the housing surface at the contact points with the gear ball row therefore preferably extend inclined obliquely with respect to a plane perpendicular to the drive shaft, with the two drive surfaces each running at the same angle with respect to the plane, i.e. being arranged mirror-symmetrical with respect to each other in relation to this plane.

A preferred deviation of the angle of inclination of one of the four surfaces from the others results in a different effective radius for the rotational movement of the associated component, with a difference in rotational speed resulting therefrom. The difference of the angles is preferably very small in comparison to the sum of the angles, and therefore a large reduction is produced with this rolling-contact differential rotational-speed gear, i.e. a large ratio between drive rotational speed and driven rotational speed. The drive shaft is preferably arranged radially on the inside such that the driven end of the shaft, which is situated on the outside, can transmit a high torque while having a compact construction space.

The housing preferably remains at rest relative to the drive shaft and to the driven shaft and is used at the same time for the mounting of both shafts. Although a ball cage or web for separate mounting of the balls is not ruled out, it is less preferable so as to avoid the associated friction losses. A clamping bearing, for example an angular ball bearing, tapered roller, self-aligning roller thrust bearing, a combination of a classic axial and radial bearing or of a sliding bearing, is preferably axially effective between the housing and a support assigned to the driven shaft. By way of the clamping bearing, it is possible, with the use of an elastic element, for example a disk spring, another component of spring steel or an integrated, elastic wall, to prestress the stiff shafts, outer rings and balls simultaneously in a specific manner and in a balanced manner with respect to the equilibrium of forces. The drive shaft and driven shaft can only rotate (e.g., cannot be displaced or tilted relative to the housing).

The gear bearing, which is predetermined by the gear ball row, and the clamping bearing can be arranged offset axially and/or radially (e.g., stacked) with respect to each other in order to achieve small diameters or short construction lengths. The gear bearing and the clamping bearing can be situated very closely adjacent to one another in order to form a compact bearing unit, or can be situated very far apart from one another in order to increase the distance of support. In the latter case, components of a driving motor may also be arranged in the intermediate space.

In addition to the gear bearing, which is predetermined by the gear ball row, and the clamping bearing, a further supporting bearing is also possible which supports the action of the gear bearing with regard to securing the drive shaft against tilting. This pure radial bearing causes over-stressing of the gear bearing and therefore should be aligned precisely with respect to the latter.

The gear stage is preferably used in a drive unit of a vehicle seat adjuster, particularly preferably for a gear fitting for adjusting the inclination of a backrest of the vehicle seat relative to a seat part, with the drive unit additionally also having a motor. However, other intended uses are also possible.

Other aspects and advantages of the present invention will become apparent from the following.

BRIEF DESCRIPTION OF THE DRAWINGS

The invention is explained in more detail below with reference to an exemplary embodiment that is illustrated in the drawing and has various variants. In the drawings:

FIG. 1 shows a schematic diagram of the exemplary embodiment.

FIG. 2 shows a schematic illustration of a vehicle seat.

FIG. 3 shows a first variant of the exemplary embodiment.

DETAILED DESCRIPTION OF EXEMPLARY EMBODIMENT

Figure 4:
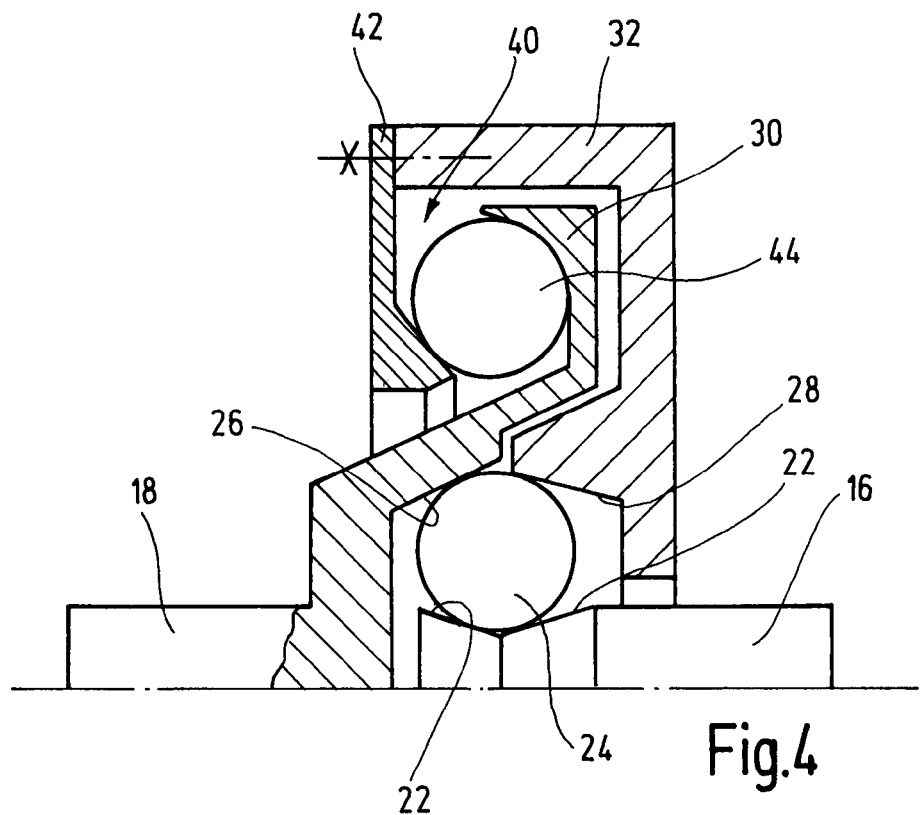
FIG. 4 shows a second variant of the exemplary embodiment.
Figure 5:
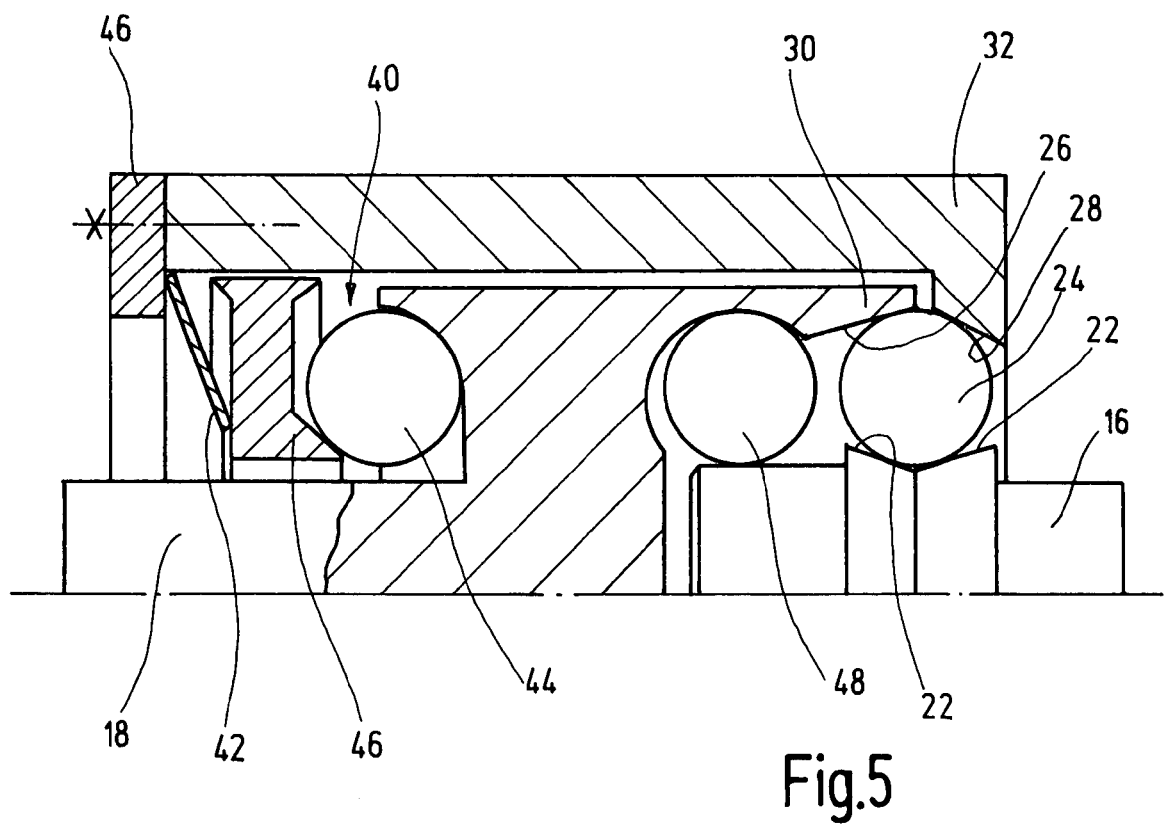
FIG. 5 shows a third variant of the exemplary embodiment.

A vehicle seat 1 has a seat part 3 and a backrest 4 that can be adjusted in inclination relative to the seat part 3. The backrest 4 is attached to the seat part 3 by way of two gear fittings 6. On one side of the vehicle seat, a drive unit 10 is attached to the backrest 4 for driving the gear fittings 6, with the gear fittings being in geared connection with one another by way of a transmission rod. The drive unit 10 has a motor 12, and a gear stage 14 is provided on the output side of the motor 12 and is in geared connection with the transmission rod. The motor 12 is an electric motor, for example an electronically commutated motor with a stator and rotor.

A drive shaft 16 is driven by the motor 12 and defines the directional details used in this Detailed Description section of this disclosure. The drive shaft 16 drives the driven shaft 18 by way of the gear stage 14, to be precise by way of a rolling-contact differential rotational-speed gear, so that the driven shaft 18 to rotates more slowly than the drive shaft 16. The drive shaft 16 has a groove 20 which opens radially outward in the shape of a funnel and is, for example, V-shaped or U-shaped, with the walls of the groove 20 forming drive surfaces 22. A plane E runs perpendicularly to the center axis of the drive shaft 16. Mirror-symmetrically with respect to the plane E, the drive surfaces 22 of the groove 20 bear tangentially at contact points $B_1$ at an angle $\alpha$ with respect to the plane E against a gear ball row 24. The gear ball row 24 comprises at least three identical balls (e.g., arranged in a row), with two contact points $B_1$ being present per ball. The groove 20 therefore opens at the contact points $B_1$ at an angle of $2\alpha$ symmetrically with respect to the plane E.

On the outer side of the gear ball row 24, as seen radially, there are two engagement surfaces, namely a driven surface 26 and a housing surface 28. The driven surface 26 bears at contact points $B_2$ tangentially against the gear ball row 24 at an angle $\beta$ with respect to the plane E. There is one contact point $B_2$ per ball of the gear ball row 24. The housing surface 28 bears at contact points $B_3$ tangentially against the gear ball row 24 at an angle $\gamma$ with respect to the plane E. There is one contact point $B_3$ per ball of the gear ball row 24. A preferably integrally formed flange of the driven shaft 18 (or a flange attached in another way) is provided as a support 30 of the driven surface 26 while a housing 32 bears the housing surface 28. The housing 32 supports the drive shaft 16 and the driven shaft 18 in the manner described, and therefore no separate bearing is required for the shafts (in the case of a small axial length). The support 30 and the region of the housing 32 with the housing surface 28 are designed as hollow rings.

If the angles $\beta$ and $\gamma$ differ from each other, i.e. contact points $B_2$ and $B_3$ are at different distances from the center axis of the drive shaft 16, different track speeds are produced for the contact points $B_2$ and $B_3$ during rotation of the drive shaft 16, which results in a relative rotation of the support 30 and the housing 32. If the difference $\beta-\gamma$ of the angles $\beta$ and $\gamma$ is very small with regard to the sum $\beta+\gamma$ of the two angles, this relative rotation takes place at a very low rotational speed. Since the housing 32 is held at rest, the driven shaft 18 then rotates at a low rotational speed relative to the housing 32. The ratio of rotational speed between drive shaft 16 and driven shaft 18 is correspondingly large, for example 200:1.

A clamping bearing 40 is provided in order to ensure the tangential bearing of the drive surfaces 22 and of the surfaces 26 and 28 by way of a sufficient axial and radial pressure application force. The clamping bearing 40 is primarily effective between the support 30 and the housing 32. Apart from the support 30 and the housing 32, the clamping bearing 40 is assigned (e.g., comprises) a clamping ball row 44 and an elastic element 42. The elastic element 42 is integrally formed on or is attached to the housing 32 and in the present case is of annular design. In the present case, the clamping bearing 40 is designed as an angular ball bearing, with the clamping ball row 44 preferably being arranged and mounted directly between the support 30 (or driven shaft 18), on the one hand, and the elastic element 42, on the other hand. However, it is also possible to provide additional intermediate pieces 46 between one of these supporting components and the clamping ball row 44.

The drawing illustrates various variants of the gear stage 14 according to the invention, with components which are identical and act in an identical manner bearing the same reference numbers. The differences arise from the various axial and radial arrangement possibilities of the gear ball row 24 and the clamping ball row 44. To improve the security of the drive shaft 16 against tilting, a supporting bearing 48 designed as a radial bearing can optionally also be provided. On account of over-stressing, the supporting bearing 48 has to be aligned very precisely with respect to the gear bearing formed by the gear ball row 24.

It will be understood by those skilled in the art that while the present invention has been discussed above with reference to an exemplary embodiment and several variants thereof, various additions, modifications and changes can be made thereto without departing from the spirit and scope of the invention as set forth in the following claims.

That which is claimed:

1. A gear stage for a vehicle seat, comprising:
   the gear stage being operatively associated with a drive shaft and a driven shaft for causing the driven shaft to rotate at a rotational speed in response to the drive shaft being rotated at a rotational speed, wherein
   (a) the rotational speed of the driven shaft is less than the rotational speed of the drive shaft when the driven shaft rotates in response to rotation of the drive shaft,
   (b) the gear stage includes at least one gear ball row,
   (c) at least one drive surface of the drive shaft bears tangentially against the gear ball row, and
   (d) at least one driven surface of the driven shaft bears tangentially against the gear ball row;
   a housing having at least one housing surface that bears tangentially against the gear ball row; and
   a clamping bearing, wherein the driven shaft comprises a support, the clamping bearing is effective between the housing and the support, and the clamping bearing comprises an elastic element and a clamping ball row.

2. The gear stage as claimed in claim 1, wherein:
at a contact point between the drive surface and the gear ball row, the drive surface extends at an oblique angle with respect to a plane that is perpendicular to the drive shaft;
at a contact point between the driven surface and the gear ball row, the driven surface extends at an oblique angle with respect to the plane; and
at a contact point between the housing surface and the gear ball row, the housing surface extends at an oblique angle with respect to the plane.

3. The gear stage as claimed in claim 2, wherein
the drive surface of the drive shaft is a first drive surface;
said oblique angle at which the first drive surface extends with respect to the plane is a first oblique angle;
the drive shaft includes a second drive surface;
the second drive surface bears tangentially against the gear ball row;
at a contact point between the second drive surface and the gear ball row, the second drive surface extends at a second oblique angle with respect to the plane; and
the first and second oblique angles are the same size with respect to one another.

4. The gear stage as claimed in claim 3, wherein
said oblique angle at which the driven surface extends with respect to the plane is a third oblique angle;
said oblique angle at which the housing surface extends with respect to the plane is a fourth oblique angle; and
the third and fourth oblique angles are different sizes with respect to one another.

5. The gear stage as claimed in claim 3, further comprising a second bearing, wherein the second bearing that is axially offset with respect to the gear ball row.

6. The gear stage as claimed in claim 2, wherein
said oblique angle at which the driven surface extends with respect to the plane is a first oblique angle;
said oblique angle at which the housing surface extends with respect to the plane is a second oblique angle; and
the first and second oblique angles are different sizes with respect to one another.

7. The gear stage as claimed in claim 6, wherein a difference between the first oblique angle and the second oblique angle, which is calculated by subtracting the second oblique angle from the first oblique angle, is very small in comparison to a sum of the first oblique angle and the second oblique angle, which is calculated by adding the second oblique angle to the first oblique angle.

8. The gear stage as claimed in claim 2, wherein:
the drive surface of the drive shaft is a first drive surface;
the drive shaft includes a second drive surface;
the second drive surface bears tangentially against the gear ball row; and
at a contact point between the second drive surface and the gear ball row, the second drive surface extends at an oblique angle with respect to the plane.

9. The gear stage as claimed in claim 2, further comprising a second bearing that is axially offset with respect to the gear ball row.

10. The gear stage as claimed in claim 1, wherein the housing remains stationary with respect to both the drive shaft and the driven shaft while the driven shaft rotates in response to rotation of the drive shaft.

11. The gear stage as claimed in claim 10, further comprising a second bearing that is axially offset with respect to the gear ball row.

12. The gear stage as claimed in claim 1, wherein the clamping bearing is, with respect to the gear ball row:
axially offset, radially offset, or any combination thereof.

13. The gear stage as claimed in claim 1, further comprising a second bearing that is axially offset with respect to the gear ball row.

14. The gear stage as claimed in claim 13, wherein the second bearing is a supporting bearing or a sliding bearing for the drive shaft.

15. The gear stage as claimed in claim 1 in combination with the vehicle, seat, wherein the vehicle seat includes an adjuster with a drive unit, and the drive unit comprises the gear stage so that the adjuster operates in response to rotation of the drive shaft.

16. The combination as claimed in claim 15, wherein:
the vehicle seat comprises a backrest and a seat part, and
the adjuster is for adjusting inclination of the backrest relative to the seat part, so that the inclination is adjusted in response to rotation of the drive shaft.

17. The gear stage as claimed in claim 1, wherein:
the drive surface of the drive shaft is a first drive surface,
the drive shaft includes a second drive surface, and
the second drive surface bears tangentially against the gear ball row.

* * * * *